United States Patent
Watanabe et al.

(10) Patent No.: US 8,659,788 B2
(45) Date of Patent: Feb. 25, 2014

(54) REDUCED PRINTING WIDTH PRINTER, PRINTER CONTROL METHOD, AND OPERATION CONTROL METHOD

(75) Inventors: Kei Watanabe, Komoro (JP); Akihiro Ikeda, Toumi (JP)

(73) Assignee: Seiko Epson Corporation, Tokyo (JP)

( * ) Notice: Subject to any disclaimer, the term of this patent is extended or adjusted under 35 U.S.C. 154(b) by 562 days.

(21) Appl. No.: 12/486,651

(22) Filed: Jun. 17, 2009

(65) Prior Publication Data

US 2009/0316162 A1    Dec. 24, 2009

(30) Foreign Application Priority Data

Jun. 18, 2008   (JP) ................................ 2008-159489

(51) Int. Cl.
   *G06F 15/00*   (2006.01)
(52) U.S. Cl.
   USPC ................ 358/1.2; 358/1.8; 358/1.9; 400/70; 400/76
(58) Field of Classification Search
   USPC .......................... 358/537, 1.11, 1.2, 528, 1.13
   See application file for complete search history.

(56) References Cited

U.S. PATENT DOCUMENTS

| | | | |
|---|---|---|---|
| 5,842,793 A | 12/1998 | Katayama et al. | |
| 7,410,311 B2 * | 8/2008 | Suzuki et al. | 358/1.18 |
| 2002/0075502 A1 * | 6/2002 | Hayama | 358/1.15 |
| 2004/0105126 A1 | 6/2004 | Minowa et al. | |
| 2004/0125423 A1 * | 7/2004 | Nishi et al. | 358/537 |
| 2004/0190012 A1 * | 9/2004 | Yamada | 358/1.2 |
| 2005/0286088 A1 * | 12/2005 | Takagi | 358/3.28 |
| 2006/0029293 A1 | 2/2006 | Matsuzaki | |
| 2008/0158605 A1 * | 7/2008 | Engbrocks et al. | 358/1.18 |
| 2008/0165370 A1 * | 7/2008 | Takayama | 358/1.2 |
| 2009/0027697 A1 * | 1/2009 | Turner et al. | 358/1.1 |

FOREIGN PATENT DOCUMENTS

| | | |
|---|---|---|
| JP | 61-197272 A | 9/1986 |
| JP | 04-001890 A | 1/1992 |
| JP | 05-024301 A | 2/1993 |
| JP | 06-243348 A | 9/1994 |
| JP | 07-168976 A | 7/1995 |
| JP | 08-123799 A | 5/1996 |
| JP | 08-132703 A | 5/1996 |
| JP | 09-286143 A | 11/1997 |
| JP | 2002-046315 A | 2/2002 |
| JP | 2004-042406 A | 2/2004 |
| JP | 2004-152256 A | 5/2004 |
| JP | 2006-048520 A | 2/2006 |
| JP | 2006-330976 A | 12/2006 |
| JP | 2006-338573 A | 12/2006 |

* cited by examiner

*Primary Examiner* — Benny Q Tieu
*Assistant Examiner* — Juan M Guillermety
(74) *Attorney, Agent, or Firm* — Kilpatrick Townsend & Stockton LLP

(57) ABSTRACT

A printer can print to paper with a narrow width while maintaining a print format with good legibility without changing the application program and printer driver installed on the host computer. The control method of a printer that prints based on print data 5 sent from a host computer 3 has a step S105 of extracting data attributes contained in the print data 5 and assigning the print data 5 to data segment areas for each data attribute; a step of setting the data segment areas to specific printing areas based on the data attribute; an actual print data generating step (steps S122, S107, S133, S134, S111) of converting the print data 5 assigned to the data segment areas to actual print data according to the data attributes; and a printing step S113 of printing the actual print data in the printing areas.

18 Claims, 5 Drawing Sheets characters/line
1 2 3 4 5 6 7 8 9 0 1 2 3 4 5 6 7 8 9 0 1 2 3 4 5 6 7 8 9 0 1 2 3 4 5 6 7 8 9 0 1 2

REDUCED PRINTING WIDTH PRINTER, PRINTER CONTROL METHOD, AND OPERATION CONTROL METHOD

This application claims priority to Japanese Patent Application No. 2008-159489, filed Jun. 18, 2008, the entirety of which is incorporated by reference herein.

BACKGROUND OF THE INVENTION

1. Field of Invention

The present invention relates to a printer that executes a printing process based on print data sent from a host computer, to a control method for a printer, and to an operation control program.

2. Description of Related Art

Retail stores are increasingly introducing POS systems in order to reduce the workload at the checkout register and to improve the accuracy of inventory management and purchasing management by linking product receiving, taking inventory, and sales results.

When the product barcode applied to a product being purchased is read at the POS register (POS terminal) installed at the checkout register of a retail store, the POS system records sales information for that product (such as the product name, quantity, sale price, total sale price, and time of sale) and issues a receipt recording the product sale price, for example.

Product sale information read by the POS terminal is normally sent from the POS terminal to a host computer, analyzed by the host computer, and used for inventory management and purchasing management.

The host computer that receives the product sale information from the POS terminal of the POS system generates receipt printing data arranged so that the sale information will fit within the specified width of the receipt paper, and outputs the resulting receipt printing data to the printer to issue a receipt.

Installed on the host computer are an application program for receipt printing that generates receipt printing data specifying the locations of the data contained in the sale information based on the product sale information received from the POS terminal, and a printer driver that outputs the receipt printing data generated by the application program to the printer.

The receipt printing data typically includes such data as the store name, the store location and phone number, the date and time of the sale, the names of the purchased products, the quantity sold, the sale price of each product, the total sale amount, and even sale announcements and other text data. The application program that generates the receipt printing data adjusts the format of the data in the receipt printing data appropriately to the data type.

In order to save paper, technology that improves the application program and printer driver installed on the host computer to generate reduced print data that shortens the line width by reducing the font size of the printed characters, for example, to enable printing on narrower paper has also been introduced. See, for example, Japanese Unexamined Patent Appl. Pub. JP-A-H05-24301, Japanese Unexamined Patent Appl. Pub. JP-A-H08-132703, Japanese Unexamined Patent Appl. Pub. JP-A-H09-286143, Japanese Unexamined Patent Appl. Pub. JP-A-2004-42406, and Japanese Unexamined Patent Appl. Pub. JP-A-2006-48520.

The paper width of the printing paper is typically fixed in printers that are used in conventional POS systems. This means that in order to change the receipt paper to paper with a narrower width in order to save paper, it is necessary to replace the printer itself with a printer that is compatible with the narrower paper. When the printer is replaced, the application program and printer driver installed on the host computer must also be changed so that the host computer can output receipt printing data compatible with the new paper width to the printer. This necessitates additional maintenance work to install the new program on the host computer.

Uniformly reducing the font size of the printed characters to produce reduced print data that fits within the changed paper width is relatively simple, but this can make the size of the characters printed on the receipt too small and reduce the legibility of the product names, purchased quantities, price, and other information printed on the receipt.

SUMMARY OF THE INVENTION

A printer, a printer control method, and an operation control program according to the present invention enable printing to paper with a narrow width while maintaining a print format with good legibility and saving paper by using narrow paper without changing the application program and printer driver installed on the host computer when the printer is changed to a model that prints to narrower paper.

A first aspect of the invention is a printer that prints based on print data sent from a host computer, the printer having a data conversion unit that extracts data attributes contained in the print data, assigns the print data to data segment areas for each data attribute, sets the data segment areas to specific printing areas based on the data attribute, and converts the print data assigned to the data segment areas to actual print data according to the data attributes; and a printing unit that prints the actual print data in the printing areas.

In this aspect of the invention print data sent from a host computer is converted by a data conversion unit on the printer side to change the format for printing by reducing the print data in specific printing areas based on the data attributes. If a POS system is changed to use narrower paper or if the printer in a POS system is changed to a model with a smaller printing width, printing to paper with a smaller width can be enabled on the printer side alone without changing the application program or the printer driver installed on the host computer. In this situation the actual print data is data converted to the dots that are actually printed by the print head of the printer.

The inconvenience of needing to change the application program or printer driver on the host computer side when the printer is introduced can therefore also be avoided, and usability can be improved when the printer is introduced. Paper consumption can also be reduced by using narrower paper as a result of changing the printer.

Furthermore, because the data segment areas are set according to the data attributes, the printing area of a particular data segment area can be changed according to a particular data attribute. Therefore, if the printing area of the data segment area is set for each data attribute, and the actual print data is generated according to the data attribute, printout with good legibility in the desired print format can be achieved.

In a printer according to another aspect of the invention the data conversion unit determines if the print data has a specific data attribute, and if the print data has the specific data attribute, allocates the print data to the data segment areas, and generates the actual print data by changing the range of white space data contained in the print data, or abbreviating at least a part of the print data, or changing the print size, or changing the amount of line feeds.

In a printer according to another aspect of the invention the data conversion unit inserts a line feed at a specific position in the print data assigned to the data segment areas if the print data has the specific data attribute, and generates the actual print data.

If the print data is receipt printing data, for example, product information such as the names of the purchased products, the quantity purchased, and the price of each product is preferably printed using a large font in a format with excellent legibility so that the customer can easily confirm the content of the purchased products. In this aspect of the invention, the print data describing the product information includes product identification data as a data attribute and is allocated to a particular data segment area; print data other than the product identification data, such as the operator's name, has normal data attributes and is allocated to different data segment areas; and particular print areas are set for each data segment area. As a result, the product identification data and the other data does not run together so that the quantity and price information becomes difficult to read. If the operator name and other such information is reduced, however, the effect is slight.

Space for printing is also assured by deleting white space data in the product information. As a result, when compared with reducing the font size of everything including the white spaces, problems caused by the font size becoming too small and the content becoming difficult to read are avoided. Problems caused by the font size becoming too small and the line spacing or other aspects of the print format changing can also be prevented.

It is therefore possible to print to narrow paper while keeping the same print format, and printout that is easy to read can be achieved.

In general, the actual data portion of the product identification data is large and there is little white space, and the product identification data often may not fit in the printing area even after the white spaces are deleted.

If in such cases the data is converted so that part of the product identification data is abbreviated, or line feeds are inserted so that the original one line of data is printed over multiple lines, or the line feed distance is shortened, the print data allocated to each data segment area can be printed to a receipt in a print format with good legibility without reducing the font size.

In other words, even when the product identification data is long, a drop in legibility resulting from reducing the font size can be avoided, and the product identification data can be printed with good legibility to narrow paper with a reduced printing width.

A printer according to another aspect of the invention preferably also has a pattern storage unit that stores patterns for generating the actual print data according to the data attributes, and the data conversion unit selects from the pattern storage unit a pattern matching the attributes of the print data assigned to the data segment areas, and generating the actual print data according to the pattern.

This aspect of the invention compares and converts the print data based on patterns previously stored in a pattern storage unit, and can therefore easily process the print data based on the data attributes in the print data. More specifically, redistributing the print data to the data segment areas and deleting white spaces can be done quickly and accurately, and printing to narrow paper can be done quickly.

In a printer according to another aspect of the invention the data conversion unit determines if the actual print data fits in the printing area, and if the actual print data is determined not to fit, generates actual print data by deleting a specific range of white space data contained in the print data, or abbreviating at least a part of the print data, or reducing the print size, or inserting a line feed at a specific position in the print data, or changing the printing position.

When the print data is reduced print data, the print data includes information other than information about the products sold, such as a store advertisement and the store name.

This information includes information that is preferably printed in its entirety even if the legibility drops slightly. By uniformly reducing all of the line data for such information by reducing the font size to conform to the preset reduced width, the loss of any required information can be prevented. Information that can be abbreviated can also be abbreviated.

The data attributes are specific codes. These codes may be, for example, attribute codes that modify the font size, color, or underlining, JIS codes for the kanji characters for "total," the ASCII codes for the text string "TOTAL," or other codes.

Another aspect of the invention is a control method for a printer that prints based on print data sent from a host computer, including a step of extracting data attributes contained in the print data and assigning the print data to data segment areas for each data attribute; a step of setting the data segment areas to specific printing areas based on the data attribute; an actual print data generating step of converting the print data assigned to the data segment areas to actual print data according to the data attributes; and a printing step of printing the actual print data in the printing areas.

With this aspect of the invention, when the printer is changed to a model with a narrower paper width, content can be printed to the narrower paper by executing these steps on the printer side without changing the application program or printer driver that is installed on the host computer.

The inconvenience of needing to change the application program or printer driver on the host computer side when the printer is introduced can therefore also be avoided, and usability can be improved when the printer is introduced. Paper consumption can also be reduced by using narrower paper as a result of changing the printer.

Another aspect of the invention is a printer operation control program that causes a computer to which is connected a printer that prints based on sent print data to execute a step of extracting data attributes contained in the print data and assigning the print data to data segment areas for each data attribute; a step of setting the data segment areas to specific printing areas based on the data attribute; an actual print data generating step of converting the print data assigned to the data segment areas to actual print data according to the data attributes; and a printing step of printing the actual print data in the printing areas.

By installing the operation control program as a driver on the host computer, this aspect of the invention enables printing to narrow paper by executing the foregoing steps without changing the application program loaded on the host computer.

The inconvenience of needing to change the application program or printer driver on the host computer side when the printer is introduced can therefore also be avoided, and usability can be improved when the printer is introduced. Paper consumption can also be reduced by using a printer that can provide this driver.

Other objects and attainments together with a fuller understanding of the invention will become apparent and appreciated by referring to the following description and claims taken in conjunction with the accompanying drawings.

DESCRIPTION OF PREFERRED EMBODIMENTS

A printer, a control method for the printer, and an operation control program according to the present invention are described below with reference to the accompanying figures.

Figure 1:
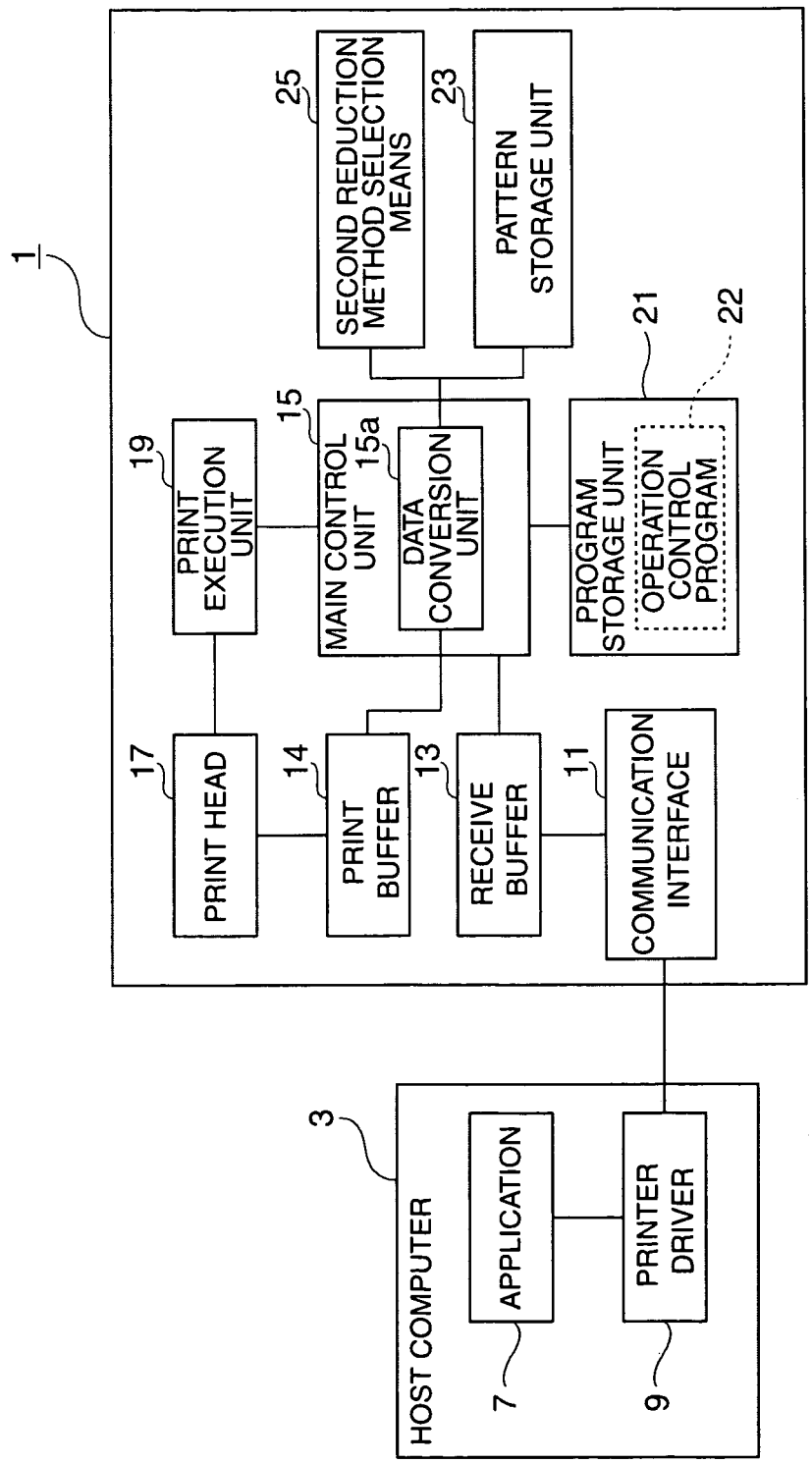
FIG. 1 is a block diagram showing the configuration of a preferred embodiment of a printer according to the present invention.
Figures 2A, 2B:
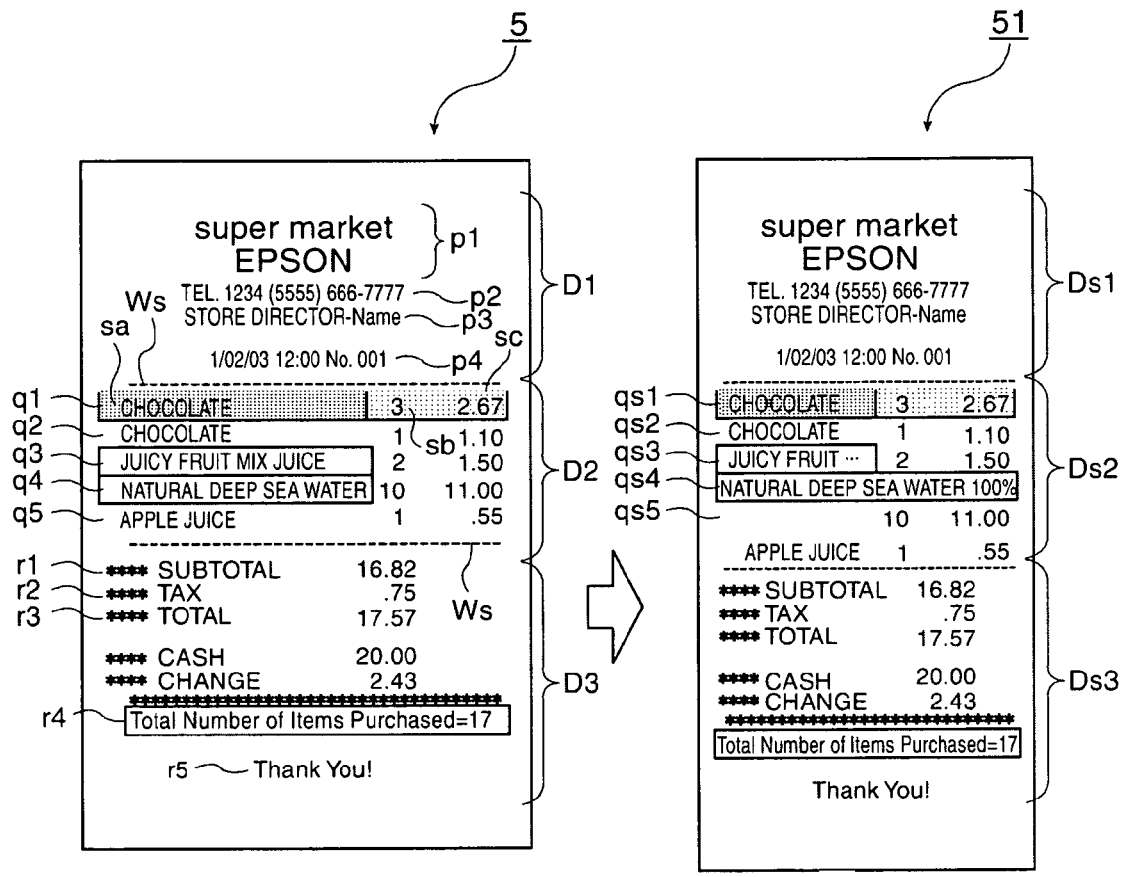
FIG. 2A shows the format of the receipt printing data that is the print data received from the host computer by the printer shown in FIG. 1.
FIG. 2B shows the receipt data in the reduced print data generated by the printer shown in FIG. 1.
Figure 3A:
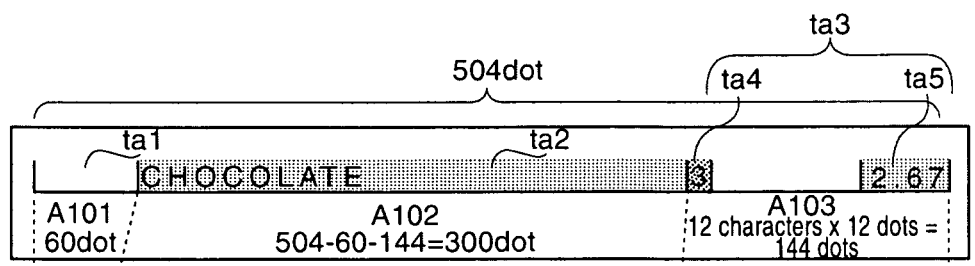
FIG. 3A shows the line data described by the product information in the print data sent from the host computer to the printer according to a preferred embodiment of the invention.
Figure 3B:
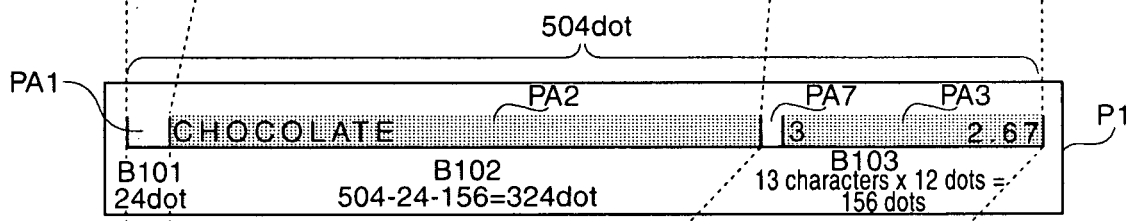
FIG. 3B shows an example of a pattern used for identifying the data sequence of the line data shown in FIG. 3A.
Figure 3C:
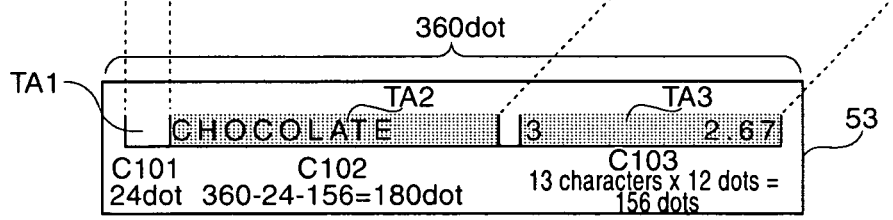
FIG. 3C shows an example of the reduced print data generated by the printer according to a preferred embodiment of the invention based on the line data shown in FIG. 3A.
Figure 4:
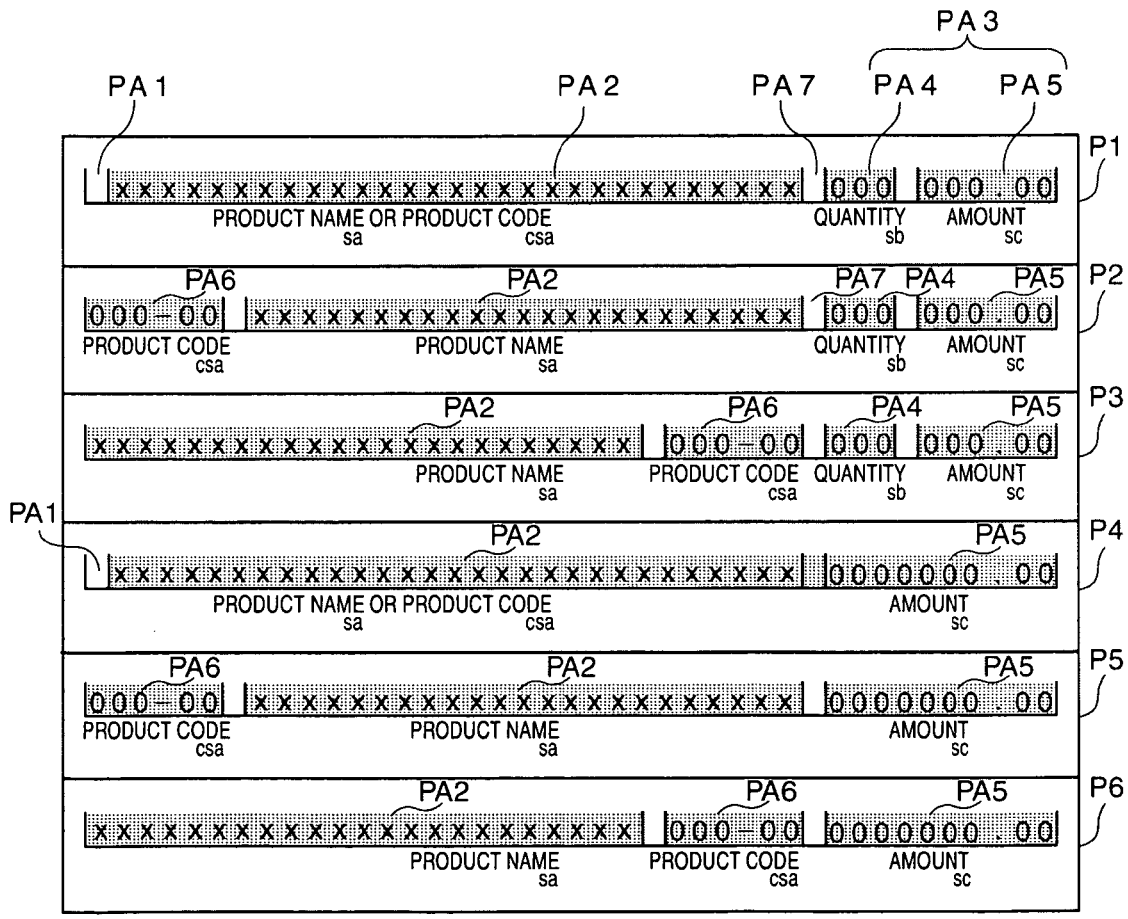
FIG. 4 describes patterns stored in the pattern storage unit of the printer shown in FIG. 1.
Figure 5:
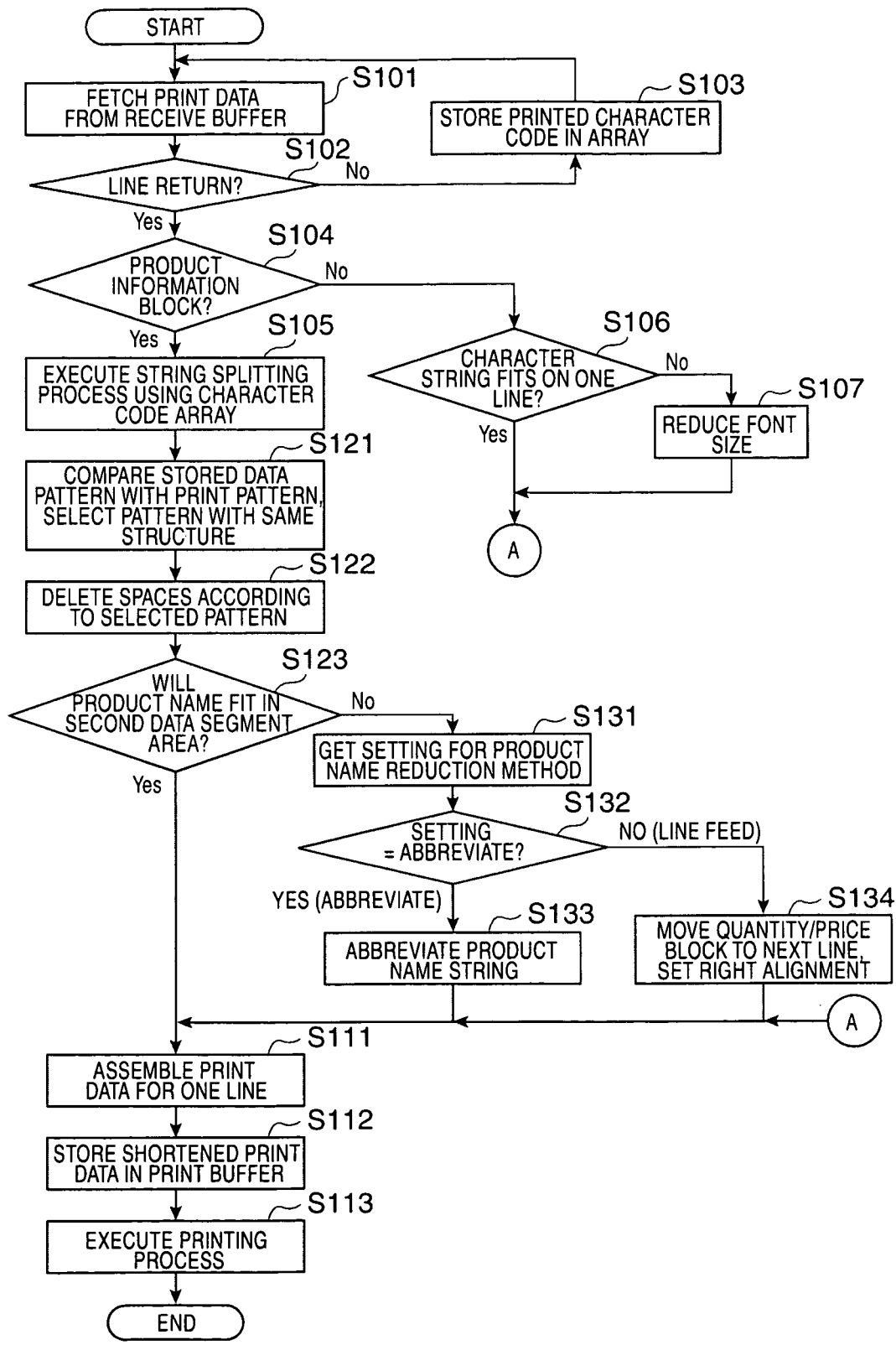
FIG. 5 is a flow chart showing the operation whereby the printer shown in FIG. 1 generates the reduced print data.

FIG. 1 is a block diagram showing the configuration of a preferred embodiment of a printer according to the present invention. FIG. 2A shows the format of the receipt printing data received from the host computer by the printer shown in FIG. 1, and FIG. 2B shows the receipt data in the reduced print data generated by the printer according to this embodiment of the invention. FIG. 3A shows the line data described by the product information in the print data sent from the host computer to the printer according to this embodiment of the invention, FIG. 3B shows an example of a pattern used for identifying the data sequence of the line data shown in FIG. 3A, and FIG. 3C shows an example of the reduced print data generated by the printer according to this embodiment of the invention based on the line data shown in FIG. 3A. FIG. 4 describes patterns stored in the pattern storage unit of the printer according to this embodiment of the invention. FIG. 5 is a flow chart showing the process whereby the printer according to this embodiment of the invention generates the reduced print data.

The printer 1 shown in FIG. 1 is a printer that prints receipts as part of a POS system, and executes a printing process based on the print data 5 (see FIG. 2A) received from a host computer 3. Note that the host computer 3 in this embodiment of the invention is a configuration including the functions of a POS terminal in a POS system.

The print data 5 is receipt printing data that is produced by a receipt printing application program 7 installed on the host computer 3 based on the product sale information sent from the POS terminal, and is sent to the printer 1 through a printer driver 9 installed on the host computer 3.

The print data 5, which is the data for printing a receipt, includes a store information block D1, a product information block D2, and a total and other information block D3 sequentially ordered from the top. The data types (data attributes) written in each information block are described below.

Included in the store information block D1 are the store name p1, store contact information (phone number) p2, store manager p3, and date and time of sale p4 on different lines.

Included in the product information block D2 are line items q1, q2, q3, and so forth for each product sold. Each line item includes a data field for printing specific product information such as the product name sa, quantity sold sb, and sale price sc at different positions across the width of the paper.

Of the product information included in each line item in the product information block D2, the location of the product name sa is set so that the first letter of the information in each line item is aligned with the first letter of each other line item. The quantity sold sb and sale price sc are both positioned so that the last digit of each field in each line item is aligned with the last digit of the same field in each other line item.

In the total and other information block D3 the before-tax subtotal r1, the tax r2, the tax-included total r3, the total number of items purchased r4, and other data r5 such as a message about a store sale are each printed on separate lines.

Printing the print data 5 inserted to the data fields of each line item on paper that is 80 mm wide is described next.

As shown in FIG. 3, the line items q1, q2, q3, and so forth in the product information block D2 are printed in a data area that is 504 dots wide across the width of the paper (42 columns wide (1 column=12 dots) if converted to print columns). In this embodiment of the invention the first 60-dot wide area from the beginning of the 504-dot wide data area is allocated to data segment ta1 containing white space for line alignment, the next 300-dot wide area is allocated to a first data segment ta2 containing the product name sa, and the next 144-dot wide area is allocated to data segment ta3 where the quantity sold sb and sale price sc are inserted.

The first 12-dot wide part at the beginning of the 144-dot wide data segment t3 is allocated to a data segment ta4 for the quantity sold sb, and the remaining 132-dot portion is allocated to a data segment ta5 where the sale price sc is inserted.

The printer 1 in this embodiment of the invention receives the print data 5 sent through the printer driver 9 from the host computer 3 through a communication interface 11 and stores the received data in a receive buffer 13.

The printer 1 also has a main control unit 15 and a print execution unit 19. The main control unit 15 converts the print data 5 stored in the receive buffer 13 to reduced print data 51 (see FIG. 2B) that is reduced to a preset reduced width (specific print area), and outputs to the print buffer 14. The print execution unit 19 drives the print head 17 based on the reduced print data 51 (actual print data) output to the print buffer 14 and executes the printing process. The print execution unit 19 executes the printing process based on the reduced print data 51 generated by the data conversion unit 15a described below within the overall operating process run by the printer 1.

The printer 1 in this embodiment of the invention has a pattern storage unit 23 that stores a plurality of patterns used to analyze the line item data in the product information block D2.

As shown in FIG. 4, the pattern storage unit 23 stores six patterns, that is, first to sixth patterns P1 to P6, for analyzing the line item data in the product information block D2. Each of the patterns P1 to P6 stores the pattern of the structure of the data segments PA1 to PA7 to which the product information, such as the product name sa, quantity sold sb, and sale price sc, in the line item data of the product information block D2 is stored.

In each of the patterns P1 to P6, data segment PA1 is white space for line alignment at the beginning of the line, data segment PA2 is the area where the product name sa and product code Csa are placed, and data segment PA3 is the area where the quantity sold sb and sale price sc are placed.

In the case of patterns P1 to P3 in FIG. 4, data segment PA3 is subdivided into a data segment PA4 where the quantity sold sb is placed and a data segment PA5 where the sale price sc is placed. In patterns P4 to P6, only the sale price sc is placed in data segment PA3.

The print width of each data area in the patterns P1 to P6 is set so that the print data 5 sent from the host computer 3 will fit within the 80 mm width of the paper.

For example, in the first pattern P1, the data segment ta1 (60 dots wide) that is white space at the beginning of the line item data in the print data 5 as shown in FIG. 3 corresponds to data segment PA1 (24 dots wide) in first pattern P1, and the first data segment ta2 (300 dots wide) where the product name sa of the print data 5 is placed corresponds to data segment PA2 (324 dots wide) in first pattern P1.

Pattern P1 also contains a 1-column (12 dot) wide blank area PA7 between data segment PA2 and the data segment PA3 where the quantity sold sb and sale price sc are placed. Data segment ta3 (144 dots wide) in the line item data of the print data 5 corresponds to the data segment PA3 in pattern P1. This blank area PA7 and data segment PA3 together have a width of 156 dots.

The printer 1 according to this embodiment of the invention determines the arrangement of the product information in each of the line items q1, q2, q3, and so forth in the product information block D2 of the print data 5 by comparison with the patterns P1 to P6. In addition, the printer 1 allocates the data segment ta1 and first data segment ta2 based on the structure of the data areas in the applied pattern, and sets the data segment areas in the printing area of the 58-mm wide paper. The printer 1 applies a process based on the data attributes to the data allocated to each of the set data segment areas, and generates the line data 53 (actual print data) of the reduced print data 51. The generated line data 53 (see FIG. 3) is stored in the print buffer 14.

The data conversion unit 15a of the main control unit 15 executes the process that generates the reduced print data 51 from the print data 5.

The data conversion unit 15a processes the print data 5 based on the operation control program 22 stored in the program storage unit 21 in the printer. More specifically, the data conversion unit 15a interprets the data attributes and arrangement of the line data contained in the print data 5, and determines to which of the information blocks D1, D2, and D3 of the print data 5 the data belongs.

If the data is contained in the product information block D2, the data conversion unit 15a allocates the product information in each line item to the data segment areas that are segmented by data attribute (such as the product name sa, quantity sold sb, sale price sc, and product code Csa). In each line item, the data segment areas are set in the printing area of the 58-mm wide paper.

As a result, reduced print data 51 of which the printing width is reduced to a preset width (58 mm in this embodiment of the invention) as shown in FIG. 2B is generated, and the generated reduced print data 51 is stored in the print buffer 14.

With the printer 1 according to this embodiment of the invention, data segment ta1, which is white space, and the data stored in the first data segment ta2 are reduced in principle by deleting white spaces in the line item data. In this embodiment a second data segment area TA2 is generated by deleting white space data from the first data segment ta2. If there are few white spaces in the first data segment ta2 and the product name sa contains much real data, the data length cannot be shortened much even if the white spaces are deleted and the data may not fit in the printing width of the anticipated reduced print data 51. In this situation the printer 1 according to this embodiment of the invention shortens the printing width of the product name sa by a different method.

The second reduction method selection means 25 shown in FIG. 1 selects the data reduction method according to the user setting of a DIP switch or memory switch in the printer 1, or according to a command from the host computer 3. More specifically, the following two methods can be selected and specified in this embodiment of the invention.

One method is to delete the data exceeding a printing width preset for the reduced print data 51 from the trailing end of the product name sa, and use the product name sa from which the end has been appropriately truncated. An ellipsis ( . . . ) can be printed at the end of the truncated product name sa to show that the name has been abbreviated. More specifically, an ellipsis is placed as shown in line item qs3 that is the third line from the top in the product information block Ds2 of the reduced print data 51 shown in FIG. 2B.

The other method is to move the data segment ta3 where the quantity sold sb and sale price sc are placed onto the next line, inserting a line feed so that the line item is printed on two lines. With this method the first data segment ta2 can be printed using the full printing width of one line so that even long product names can be printed without abbreviation. In addition, the data segment ta3 that is moved to the next line is shifted so that the last column of the sale price sc is aligned with the right end of the data area and the end of the data segment ta3 is aligned with the end of each other line. More specifically, such a line item is printed as shown by line item data qs4 on the fourth line and line item data qs5 on the fifth line from the top of the product information block Ds2 of the reduced print data 51 shown in FIG. 2B.

The process whereby the data conversion unit 15a sets the data segment areas, deletes data, and inserts line feeds as described above is achieved by running the operation control program 22 stored in the program storage unit 21.

The control process of this operation control program more specifically controls the printing operation of the printer 1 as shown in the flow chart in FIG. 5. The method executed by the printer 1 to generate the reduced print data is described next with reference to the flow chart in FIG. 5.

The data contained in the print data 5 is read from the receive buffer 13 (step S101), and the data arrays for each line are extracted by detecting the line feeds (steps S101, S103).

The codes (data attributes) of the text data and numeric data in the line item data is then analyzed, and whether the line item data is data contained in the product information block D2 of the print data 5 (step S104).

The following methods (A) to (C) can be used to determine if the data is contained in the product information block D2.

Text strings such as "subtotal" and "total" are stored as keywords for information block evaluation in memory in the printer 1, and whether the text string for any of these keywords is contained in the line item data of the print data 5 is determined. Detecting one of these text strings means that line item data for the total and other information block D3 was read and reading the line item data for the product information block D2 has ended. More specifically, this method treats the line item data preceding the appearance of these text strings as the line item data of the product information block D2.

Line item data that does not conform to any of the patterns stored in the pattern storage unit 23 is treated as data for an information block other than the product information block D2.

If a special text string (such as a string Ws of consecutive hyphens (-) in the example shown in FIG. 2A) denoting the border between the information blocks is detected before or after the product information block D2, the next line after the special string Ws read first is identified as the first line of the product information block D2, and the line before the special string Ws read next is treated as the last line of the product information block D2.

If it is determined that the data does not belong in the product information block D2 (that is, if the data is in the store information block D1 or the total and other information block D3, step S104 returns No), the printing width of the text strings or numeric strings in the line data is calculated, and whether the data will fit in the printing width of one line of the narrow (58 mm wide) paper used by the printer 1 is determined (step S106). If it is determined that the line data will not fit in the line width of the narrow paper (step S106 returns No), the font size of the letters and numbers in the line data is reduced so that the line data will fit in the printing width of the narrow paper (step S107).

Line data that is determined in step S106 to fit in the line printing width of the narrow paper, and line data that has been reduced in step S107 so that it will fit in the line printing width of the narrow paper, is recognized as line data for one line of the reduced print data 51 (step S111) and is sequentially stored by line unit in the print buffer 14 (step S112). When printing is then triggered, the print head and paper transportation mechanism are driven to execute the printing process (step S113).

However, if in step S104 it is determined that the data belongs in the product information block D2 of the print data 5 (step S104 returns Yes), a string splitting process that distributes the different parts of the product information to the data segment areas is executed using the array of text codes contained in the acquired line data (step S105). As described above, this string splitting process is a process that divides the line item data based on the code strings contained therein into the first data segment ta2 containing the product identification data, the data segment ta3 containing numeric data such as the product quantity and price (data other than the product identification data) and the white spaces segment ta1.

When the string splitting process is applied to each line item in the product information block D2 in step S105, the methods (D) to (G) below can be used to evaluate the data attributes, such as the product quantity and price information, contained in each line item.

(D) The end of the line item data is treated as the end of the price data.

(E) Strings containing ASCII codes 0x31 to 0x39 (the numbers 0 to 9) are treated as the quantity and price strings.

(F) Strings containing a combination of ASCII codes 0x31 to 0x39 (the numbers 0 to 9), a currency symbol such as 0x24 ($) or 0x2F (¥, yen), and a decimal point (0x2E) (.) are treated as the price.

(G) Values following a specific number of consecutive white spaces (such as 12 dots) are treated as the next data segment area.

The strings in each of the data segment areas output from step S105 are then compared or contrasted with the patterns P1 to P6 stored in the pattern storage unit 23 to determine the pattern matching the array structure of the data segment areas (step S121). Based on the structure of the applicable pattern, the data segment ta1 and first data segment ta2 are set to the printing area (printing width) of the 58-mm wide paper. White spaces contained in the data allocated to the set data segment ta1 and first data segment ta2 are then deleted (step S122).

Whether the product name sa will fit in the second data segment area TA2 after white spaces are removed in step S122 is then determined (step S123). If in step S123 it is determined that the product name sa will fit in the printing width of the second data segment area TA2 in the reduced print data 51 (step S123 returns Yes), control goes to step S111, the line data from which white spaces were deleted in step S122 is stored in the print buffer 14 as the line data 53 for one line of the reduced print data 51 (step S112). When printing is then triggered, the print head and paper transportation mechanism are driven to execute the printing process (step S113).

However, if in step S123 it is determined that the product name sa will not fit in the printing width of the second data segment area TA2 in the reduced print data 51 (step S123 returns No), control goes to step S131.

In step S131 the setting for the reduction method selected by the second reduction method selection means 25 is acquired. If the setting is set to a method that abbreviates part of the product name (step S132 returns ABBREVIATE), a product name that abbreviates part of the product name sa so that it will fit in the shortened second data segment area TA2 (see FIG. 3) is created (step S133). Using the abbreviated product name data, line data such as shown in line item qs3 that is the third line from the top in the product information block Ds2 of the reduced print data 51 shown in FIG. 2B is produced and stored in the print buffer 14 (step S111, step S112). When printing is then triggered, the print head and paper transportation mechanism are driven to execute the printing process (step S113).

If in step S132 the setting is set to a method that changes the number of line feeds (step S132 returns LINE FEED), the data contained in data segment TA3 is carried to the next line so that the line item is printed over two lines, and the data in this data segment TA3 is set to right aligned (step S134). The line item data spanning two lines is then stored together in the print buffer 14 (steps S111, S112). When printing is then triggered, the print head and paper transportation mechanism are driven to execute the printing process (step S113).

The process described in FIG. 5 produces line item data for reduced print data 51 as shown in FIG. 2B.

The resulting reduced print data 51 thus contains a store information block Ds1, product information block Ds2, and total and other information block Ds3 corresponding respectively to the information blocks D1, D2, and D3 in the print data 5 sent form the host computer 3 reduced so that the printing width is shortened to a specified width.

With the method of generating reduced print data shown in FIG. 5, if the line data will not fit in the preset reduced width after the data placed in the store information block D1 and total and other information block D3 is processed by the sequence of steps S101 to S104, the font size is reduced in step S107 so that the data will fit in the preset reduced width, line data that will fit in the specified reduced width is generated, and the printing process is executed.

However, after the data placed in the product information block D2 is processed by the sequence of steps S101 to S104, the print data is shortened by deleting white spaces in the data segment ta1 and first data segment ta2. If the data will still not fit in the preset shortened width, line data that will fit in the specified reduced width is generated by removing part of the product name sa or inserting a line feed at the data segment TA3 to shorten the length of data on one line based on the second reduction method set by the second reduction method selection means 25, and the printing process is executed.

In this embodiment of the invention, if it is determined in step S123 that the product name sa will not fit in the printing width of the second data segment area TA2, an abbreviated product name sa is generated and printed, or the data segment TA3 is carried to the next line, but the invention is not so limited. For example, more white spaces may be deleted if any white spaces that can be deleted remain, the font size of the product name sa can be reduced, or a line feed can be inserted at a specific position in the product name sa.

With the printer 1 and the control method therefor described above, the print data 5 sent from the host computer 3 is converted to reduced print data 51 of which the printing width (printing area) is shortened to a preset reduced width by a data conversion unit 15a in the printer 1 that receives the print data 5, and is then printed by the printing unit. Therefore, if the printer 1 in a POS system is changed to a model with a smaller printing width, printing to paper with a smaller width can be enabled on the printer 1 side alone without changing the application program 7 or the printer driver 9 installed on the host computer 3.

The inconvenience of needing to change the application program 7 or printer driver 9 on the host computer 3 side when the printer 1 is introduced is also avoided, and usability can be improved when the printer 1 is introduced. Paper consumption can also be reduced by using narrower paper as a result of changing the printer 1.

Furthermore, with the printer 1 and the control method therefor described above, because the line item data that describes the product information is divided into at least a first data segment ta2 containing the product name sa or other product identification data, and a data segment ta3 containing numeric data such as the product quantity and price, and printing areas are defined for each of the data segment areas ta2 and ta3, the legibility of the quantity and price information is not reduced as a result of the product identification data and numeric data such as the quantity and price running continuously together.

Space for printing is also assured by deleting white spaces in the first data segment ta2. As a result, when compared with reducing the font size of everything including the white spaces, problems caused by the font size becoming too small and the content becoming difficult to read are avoided. Problems caused by the font size becoming too small and the line spacing or other aspects of the print format changing can also be prevented. It is therefore possible to print to narrow paper while keeping the same print format, and receipts that are easy to read can be achieved.

Furthermore, if part of the product identification data is abbreviated or the original one line of data is printed over multiple lines as in the printer 1 and the control method according to the preferred embodiment described above, the printing positions of the data in the data segment areas TA2 and TA3 can be aligned without reducing the font size, and receipts can be printed in a print format with good legibility.

In addition, the printer 1 according to this embodiment of the invention has a pattern storage unit 23 that stores patterns P1 to P6 describing sample structures of the data segments ta1, ta2, and ta3 composing the line item data in the print data 5, and the data conversion unit 15a that generates the reduced print data 51 selects the applied pattern that matches the content of each data segment, and deletes white spaces according to the structure of the applied pattern.

As a result, processing based on the data attributes of the data contained in each line item is therefore simple, the process of redistributing the data to the appropriate data segment areas and the process of deleting white spaces can be executed quickly and accurately, and the process of printing to narrow paper can be completed quickly.

Furthermore, if the print data 5 is receipt printing data, line data contained in the print data 5 includes information other than information about the products sold, such as a store advertisement printed in the total and other information block D3 and the store name and other information printed in the store information block D1.

Because this information is preferably printed in its entirety even if the legibility drops slightly, the printer 1 and control method therefor according to this embodiment of the invention uniformly reduce all of the line data by reducing the font size to conform to the preset reduced width and thereby prevent the loss of any required information.

The embodiments described above specifically describe a method of comparison with pattern P1, but reduced print data can also be generated by comparison with the other patterns P2 to P6. In FIG. 4 patterns P2, P3, P5, P6 write the product name sa and product code Csa to separate data segment PA2 and PA6, but can be compared as a single data segment PA2 with the print data 5.

Use of the printer according to the present invention is also not limited to POS systems. The invention can be used in any type of printer in which the width of the paper that is used is limited.

When a product name sa in the product information block D2 will not fit in the preset reduced width, the foregoing embodiment describes moving the data segment TA3 to the next line and converting a line item that is normally printed on one line to line data printed over two lines, but the invention is not so limited. For example, if the length of the data allocated to the second data segment area TA2 is particularly long, the data in the second data segment area TA2 may be spread over two lines and the data segment TA3 may be printed on a third line, thus generating line data spanning multiple lines.

When line data other than the product information will not fit on one line of the reduced print data 51, the foregoing embodiment describes a method of reducing the printing width by reducing the font size, but this method of reducing the printing width by reducing the font size can conceivably be used in combination with the method of reducing the product information block D2.

For example, when part of the product name sa is omitted, the font size of the partial text string remaining in the second data segment area TA2 can be reduced so that the amount of information contained in the second data segment area TA2 can be increased.

Furthermore, there is no loss of information with the methods of reducing the printing width by deleting white spaces or inserting line feeds that are used to reduce the printing width of the line item data in the product information block D2, these methods can also to shorten the line data in the store information block D1 and total and other information block D3.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A printer that prints based on print data sent from a host computer, comprising:
    a data conversion unit that extracts one or more data types contained in the print data,
    wherein the print data comprises line data and further wherein the one or more data types are associated with the line data,
    assigns the one or more data types to one or more horizontal data segment areas with an associated print width for each data type,
    set each of the one or more horizontal data segment areas to one or more specific printing areas based on the data type, and
    converts the print data assigned to the one or more horizontal data segment areas to actual print data according to the one or more data types and the associated print width, wherein the data conversion unit inserts a line feed at a specific position in the print data assigned to the data segment areas if the print data has the specific data type, and generates the actual print data; and a print unit that prints the actual print data in the printing area based on a total print width.

2. The printer described in claim 1, wherein:

the data conversion unit determines if the print data has a specific data type, and if the print data has the specific data type, allocates the print data to the horizontal data segment areas, and generates the actual print data by changing the range of white space data contained in the print data, or abbreviating at least a part of the print data, or changing the print size, or changing the amount of line feeds when the total print width is reduced to a preset width.

3. The printer described in claim 1, further comprising:

a pattern storage unit that stores patterns for generating the actual print data according to the data types, the data conversion unit selecting from the pattern storage unit a pattern matching the types of the print data assigned to the horizontal data segment areas, and generating the actual print data according to the pattern, wherein the patterns identify a data sequence of the line data.

4. The printer described in claim 1, wherein:

the data conversion unit determines if the actual print data fits in the horizontal printing area, and if the actual print data is determined not to fit within the reduced preset width, generates actual print data by deleting a specific range of white space data contained in the print data, or abbreviating at least a part of the print data, or reducing the print size, or inserting a line feed at a specific position in the print data, or changing the printing position.

5. The printer described claim 1, wherein the data type is a specific code.

6. The printer described in claim 1, wherein the horizontal data segments include information blocks in which data types are written in the information blocks.

7. The printer described in claim 6, wherein the print data is for printing a receipt, and the information blocks includes one of store information, product information, a total, or other information blocks sequentially ordered from a top of the receipt.

8. The printer described in claim 7, wherein the data types in the store information block include at least store name, store contact information, store manager, data or time of sale.

9. The printer described in claim 7, wherein the data types in the product information block include at least product name, quantity, or price.

10. The printer described in claim 7, wherein the data types in the total information block include at least subtotal before tax, tax, and total including tax, total number of items, or other information.

11. A control method for a printer that prints based on print data sent from a host computer, comprising:

a step of extracting one or more data types contained in the print data, wherein the print data comprises line data, and assigning the print data to one or more data segment areas each with an associated print width for each data type based on the data type;

a step of setting the one or more data segment areas to one or more specific printing areas based on the data type;

an actual print data generating step of converting the print data assigned to the one or more data segment areas to actual print data according to the one or more data types and the associated print width for each data type, wherein the actual print data generating step inserts a line feed at a specific position in the print data assigned to the data segment areas if the print data has the specific data type, and generates the actual print data; and a printing step of printing the actual print data in the printing areas based on a total print width.

12. The printer control method described in claim 11, wherein:

the actual print data generating step generates the actual print data by changing the range of white space data contained in the print data, or abbreviating at least a part of the print data, or changing the print size, or changing the amount of line feeds when the total print width is reduced to a preset width.

13. The control method described in claim 11, wherein the horizontal data segments include information blocks in which data types are written in the information blocks.

14. The control method described in claim 13, wherein the print data is for printing a receipt, and the information blocks includes one of store information, product information, a total, and other information blocks sequentially ordered from a top of the receipt.

15. The control method described in claim 14, wherein the data types in the store information block include at least store name, store contact information, store manager, data or time of sale.

16. The control method described in claim 14, wherein the data types in the product information block include at least product name, quantity, or price.

17. The control method described in claim 14, wherein the data types in the total information block include at least subtotal before tax, tax, and total including tax, total number of items, or other information.

18. A server computer connected to a printer that print based on sent print data, the server computer comprising a processor, and a non-transitory computer-readable medium comprising code executable by the processor to execute a printer operation control method, the printer operation control method comprising:

extracting one or more data types contained in the print data wherein the print data comprises line data, and assigning the print data to one or more data segment areas each with an associated print width for each data type based on the data type;

setting the one or more data segment areas to one or more specific printing areas based on the data type;

generating converting the print data assigned to the one or more data segment areas to an actual print data according to the one or more data types and the associated print width for each data type, inserting a line feed at a specific position in the print data assigned to the data segment areas if the print data has the specific data type, and generates the actual print data; and printing the actual print data in the printing areas based on a total print width.

* * * * *